US009210585B2

(12) United States Patent
Futaki et al.

(10) Patent No.: US 9,210,585 B2
(45) Date of Patent: Dec. 8, 2015

(54) METHOD OF MANAGING TRACE SESSIONS IN A NETWORK AND TRACE SESSION MANAGEMENT SYSTEM

(75) Inventors: Hisashi Futaki, Kanagawa (JP); Caroline Jactat, Paris (FR); Giorgio Nunzi, Heidelberg (DE)

(73) Assignees: NEC CORPORATION, Tokyo (JP); NEC EUROPE LTD., Heidelberg (DE)

( * ) Notice: Subject to any disclaimer, the term of this patent is extended or adjusted under 35 U.S.C. 154(b) by 188 days.

(21) Appl. No.: 13/821,693

(22) PCT Filed: Jan. 17, 2012

(86) PCT No.: PCT/EP2012/050659
§ 371 (c)(1),
(2), (4) Date: Mar. 8, 2013

(87) PCT Pub. No.: WO2012/098129
PCT Pub. Date: Jul. 26, 2012

(65) Prior Publication Data
US 2013/0171944 A1    Jul. 4, 2013

(30) Foreign Application Priority Data
Jan. 17, 2011    (EP) ..................................... 11000316

(51) Int. Cl.
*H04W 24/00*    (2009.01)
*H04W 24/10*    (2009.01)
*H04W 16/18*    (2009.01)
*H04W 24/08*    (2009.01)

(52) U.S. Cl.
CPC .............. *H04W 24/00* (2013.01); *H04W 24/10* (2013.01); *H04W 16/18* (2013.01); *H04W 24/08* (2013.01)

(58) Field of Classification Search
None
See application file for complete search history.

(56) References Cited

U.S. PATENT DOCUMENTS

2011/0319115 A1* 12/2011 Racz .............................. 455/514

OTHER PUBLICATIONS

3GPP TSG-SA5 (Telecom Management) S5-101255, Meeting SA5#71, May 10-14, 2010, Montreal, Canada.*
GPP TSG.RAN WG3 Meeting #7Ibis, R2-105314 China, Xi'an, Oct. 11-Oct. 15, 2010.*
3GPP TS 32.422 V10.2.0 (Dec. 2012): "3GPP TS 32.422 V10.2.0 (Dec. 2012); 3rd Generation Partnership Project; Technical Specification Group Services and System Aspects; Telecommunication management; Subscriber and equipment trace; Trace control and configuration management (Release 10)", 3GPP Standard; 3GPP TS 32.422, 3rd Generation Partnership Project (3GPP), Mobile Competence Centre., 650, Route Des Lucioles, F-06921 Sophia-Antipolis Cedex, No. V10.2.0, Dec. 27, 2010, pp. 1-106.

(Continued)

*Primary Examiner* — Kouroush Mohebbi
(74) *Attorney, Agent, or Firm* — Young & Thompson (57) ABSTRACT

A method of managing trace sessions in a network, wherein each trace session is assigned a Trace ID and a specific trace collection entity TCE (5) from a plurality of TCEs (5) disposed inside the network for storing the related measurements of the trace session, is characterized in the steps of partitioning the space of the Trace ID such that each partition is associated to one or more of the plurality of TCEs (5), encoding a partition ID inside the Trace ID, and mapping the partition ID to a specific TCE (5) from the plurality of TCEs (5). Furthermore, a corresponding trace session management system is described.

18 Claims, 4 Drawing Sheets

(56) References Cited

OTHER PUBLICATIONS

NTT DoCoMo et al.: "3GPP TSG-RAN2 #72bi s; R2-110274; On TCE IP Address configuration to the UE", 3GPP Draft; R2-110274 TCE IP Addrress, 3rd Generation Partnership Project (3GPP), Mobile Competence Centre; 650, Route Des Lucioles ; F-06921 Sophia-Antipolis Cedex ; France, vol. RAN WG2, no. Dublin, Ireland; Jan. 17, 2011, Jan. 11, 2011, pp. 1-4, XP050492971, [retrieved on Jan. 11, 2011] p. 1, "1. Introduction"; pp. 1 and 2, "2.2 Operational and Security Concerns"; pp. 2 and 3, 2.3.
NEC: "3GPP TSG SA5 #76; S5-111281; Removal of TCE IP Address in MDT configuration sent to UE", 3GPP Draft; S5-111281 CR RIO 32.422 Removal of TCE IP Address in MDT Configuration Sent to UE, 3rd Generation Partnership Project (3GPP), Mobile Competence Centre ; 650, Route Des Lucioles ; F-06921 Sophia-Antipolis Cedex ; France, vol. SA WG5, no. San Diego, USA; Feb. 28, 2011, Feb. 20, 2011, pp. 1-5, XP050530432, [retrieved on Feb. 20, 2011] p. 1; p. 4, lines 23-30.
NEC: "3GPP TSG SA5 #76; S5-111235; Use of trace reference for retrieving TCE IP address", 3GPP Draft; S5-111235 Use of Trace Reference for Retrieving TCE IP Address, 3rd Generation Partnership Project (3GPP), Mobile Competence Centre; 650, Route Des Lucioles ; F-06921 Sophia-Antipolis Cedex ; France, vol. SA WG5, no. San Diego, USA; Feb. 28, 2011, Feb. 20, 2011, p. 1, XP050530401, [retrieved on Feb. 20, 2011] A,P the whole document, cited in ISR.
Nokia Siemens Networks: "3GPP TSG SA5 #71; S5-101255; UE selection related to Minimisation of Drive Test", 3GPP Draft; S5-101255—UE Selection Aspects in MDT, 3rd Generation Partnership Project (3GPP), Mobile Competence Centre; 650, Route Des Lucioles ; F-06921 Sophia-Antipolis Cedex ; France, vol. SA WG5, no. Montreal, Canada; May 10, 2010, May 2, 2010, pp. 1-4, XP050440433, [retrieved on May 2, 2010] the whole document, cited in ISR.
Nokia Siemens Networks: "3GPP TSG-SA5 #74; S5-103123 Alternative way for getting the IP address of TCE", 3GPP Draft; S5-103123 Fetching TCE Address, 3rd Generation Partnership Project (3GPP), Mobile Competence Centre; 650, Route Des Lucioles ; F-06921 Sophia-Antipolis Cedex ; France, vol. SA WG5, no. Jacksonville, USA; Nov. 15, 2010, Nov. 7, 2010, pp. 1-2, XP050529237, [retrieved on Nov. 7, 2010] the whole document, cited in ISR.
International Search Report, dated Jul. 13, 2012, from corresponding PCT application.
3GPP TSG-RAN WG3 Meeting #71bis, "MDT Configuration profile", R2-105314, Agenda 4.3.1.2, Huawei, HiSilicon, 2010.

* cited by examiner

METHOD OF MANAGING TRACE SESSIONS IN A NETWORK AND TRACE SESSION MANAGEMENT SYSTEM

The present invention relates to a method of managing trace sessions in a network, wherein each trace session is assigned a Trace ID and a specific trace collection entity TCE from a plurality of TCEs disposed inside said network for storing the related measurements of said trace session.

Furthermore, the present invention relates to a trace session management system, comprising at least one network entity configured to activate trace sessions with an assigned Trace ID, one or more UEs performing tracing, and a plurality of TCEs storing trace session measurements from said UEs.

BACKGROUND OF THE INVENTION

Minimization of Drive Tests (MDT) is a mechanism adopted in 3GPP for optimizing radio resources of networks. When MDT is activated in a network, one or multiple User Equipments (UEs) are requested to perform radio related measurements, like e.g. radio signal strengths, visible cells, lacks of signal, hand-over related metrics, etc., to log these measurements and to send them back again to the network. Without MDT these measurements need to be performed through technical people, who are moving in the affected area with dedicated devices and normally driving a car (driving tests): therefore the scope of MDT.

The set of measurements collected from a UE is called "trace". The process of collecting the measurements is called "tracing". Generally, in a 3GPP network tracing may be activated in different network nodes, e.g. in the eNB (also termed eNodeB), which denotes the Base Station in LTE (Long Term Evolution), in the RNC (Radio Network Controller), which denotes the Base Station in 3G, in the MME (Mobility Management Entity), which constitutes the Core Network for LTE radio access, or the like. Once tracing is activated in one of these network nodes, said network node configures tracing on the UEs.

The measurements from the UEs are stored in a dedicated entity, which is called Trace Collection Entity (TCE); practically the TCE is implemented as a database for the measurement data. Every time the network receives the measurements, it reports them to the TCE. In general, multiple TCEs can exist in the same network and the TCE of a particular trace session is chosen at the activation time of MDT for that trace session and remains fixed for the entire tracing process.

A trace session configuration contains different information elements, among them one information element called "Trace Reference" and one information element called "TCE IP address". Both information elements are specified in document 3GPP TS 32.422 "Subscriber and equipment trace; Trace control and configuration management". The information element "TCE IP address" contains the IP address of the TCE that has been chosen as TCE for the corresponding trace session. The information element Trace Reference includes i) a network operator identity consisting of MNC (Mobile Network Code) and MCC (Mobile Country Code) and ii) a Trace ID which uniquely identifies the trace session within the network operator.

While satisfying solutions of MDT for UEs in connected mode exist, one particular feature of MDT is the measurement from UEs that are in idle mode. A UE in idle mode cannot report measurements immediately, but it needs to cache them and to report them at a later stage with special signaling with the network. Through this signaling, the UE advertises the possessing of logged measurements to the network; then, the network initializes an RRC (Radio Resource Connection) procedure to retrieve the logged measurements from the UE.

In this regard, i.e. with a UE in idle mode, the presence of multiple TCEs in the network poses some challenges for MDT. In fact, the network node receiving the measurements might not be the same as the one who activated MDT on that UE. In such case the new node, i.e. the network node actually receiving the measurements, has no knowledge about the destination TCE of that UE.

At current time 3GPP has endorsed a very simple solution for this problem. In the current solution the IP address of the TCE is transmitted to the UE at configuration time. The UE transmits the IP address of the TCE back to the network in the report messages. In this way the network knows about the destination TCE of the UE. However, this solution—currently existing in 3GPP specifications, as described in the above mentioned document—has several drawbacks, mainly related to security. In particular, the IP address of the network nodes in the core network should not be disclosed to mobile equipments or end users. Another drawback is related to network operation issues, like load balancing, usage of NAT (Network Address Translation), etc., as described in document R2-110274, "On TCE IP Address configuration to the UE", 3GPP contribution to RAN2#72bis.

Currently there are two alternatives under discussion in 3GPP. These two alternatives represent the state of the art in the problem space of retrieving the IP address of the TCE from UE with MDT in idle mode. The first alternative is a dynamic query of the TCE IP address in the backend which is, however, rather cumbersome. According to the second alternative an ID is used for TCE. Instead of the IP address (32 bits (respectively 128 bits) in case IPv4 (respectively IPv6) address is used), an ID of the TCE is sent to the UE. The ID is then mapped to the respective IP address on the backend. However, the drawback of this solution is that then this ID is sent over the radio interface, which is considered as a precious transmitting channel and a bottleneck in network signaling.

It is therefore an object of the present invention to improve and further develop a method of managing trace sessions and a trace session management system of the initially described type in such a way that an efficient provision of TCE IP addresses to network elements receiving trace measurements is realized, without revealing the addresses towards mobile equipments or end users and without causing overhead over the radio link.

SUMMARY OF THE INVENTION

In accordance with the invention, the aforementioned object is accomplished by a method comprising the features of claim 1. According to this claim, such a method is characterized in the steps of partitioning the space of the Trace ID such that each partition is associated to one or more of said plurality of TCEs, encoding a partition ID inside said Trace ID, and mapping said partition ID to a specific TCE from said plurality of TCEs.

Furthermore, the aforementioned object is accomplished by a system comprising the features of independent claim 13. According to this claim, such a system is characterized in that the system further comprises processing means configured to partition the space of the Trace ID such that each partition is associated to one or more of said plurality of TCEs, to encode a partition ID inside said Trace ID, and to map said partition ID to a specific TCE from said plurality of TCEs.

According to the invention it has been recognized that an efficient provision of TCE IP addresses across different network elements in a 3GPP network can be achieved by means of a specific partitioning and encoding scheme. The proposed method avoids the transmission of an additional information element over the air, between eNB and UE. Instead, it is proposed to generate a partition ID that is encoded in signaling messages that already exist. The encoding mechanism can be defined in a way that guarantees backward compatibility with existing procedures of MDT. Additionally, the encoding provides an efficient method to map the TCE IP address to the identifier transmitted over the air. The partitioning of the Trace ID space can be performed a priori through OAM procedures.

As further advantage the method according to the present invention avoids the uncovering of the TCE IP addresses towards mobile equipments or end users. In addition, it provides space for optimization of usage of TCEs (e.g. load balancing).

According to a preferred embodiment the Trace ID together with a network operator identity may be contained in a Trace Reference information element, wherein the Trace ID uniquely identifies the trace session within the network operator. In order to ensure compatibility with the existing standard, the Trace Reference information element may be composed in the same way as described in document 3GPP TS 32.422, i.e. in the form of MCC+MNC plus Trace ID, wherein MCC denotes the Mobile Country Code and MNC denotes the Mobile Network Code.

In a preferred embodiment with high standard compatibility it may be provided that the Trace Reference information element, including the encoded partition ID inside the Trace ID, is transmitted from said network to User Equipment in a trace session configuration message.

Advantageously, the number of partitions of the Trace ID is chosen to be greater or at least equal to the number of the plurality of TCEs disposed inside the network. This specification provides enough space for an efficient optimized usage of different TCEs in the network, e.g. for performing load balancing between the TCEs. With respect to a straightforward handling of the partitions in the framework of mapping tables, it may be further provided that the number of partitions is chosen to be a power of two. This means that in case of, e.g., 7 TCEs be provided in the network, the number of partitions should be $2^3=8$.

Regarding the encoding it may be provided that syntax and semantic of the Trace ID are compatible with existing procedures in 3GPP such that backward compatibility with existing procedures of MDT is guaranteed. In a specific embodiment the encoding is performed by using a predetermined part of the bits of the Trace ID for transporting the partition ID, for instance the first two bits or the last four bits. Accordingly, the remaining part of the bits of the Trace ID may then be used for transporting a Trace sub ID. More complex encoding schemes using bitwise operations and, as the case may be, padding zeros may also be employed. In such cases, however, the bitmask employed in the respective encoding scheme should be sent from the network to the User Equipment being traced.

With respect to even further standard compatibility it may be provided that the Trace Reference information element is transmitted from User Equipment to the network together with the User Equipment measurement reports. Upon receiving these reports, the receiving network node, e.g. eNB, can extract the partition ID from the Trace Reference information element. Preferably, this can be done by performing a bitwise XOR operation in accordance with the scheme employed for encoding.

Since the partition does not identify immediately the TCE, a mapping scheme should be provided. In the simplest case, the number of partitions is the same as the number of TCEs. In this case, the IP address can be derived from a corresponding mapping table that directly maps the partition IDs to TCE IP addresses. In case the number of partitions is higher than the number of TCEs, a mapping table may be provided that maps the partition IDs to intermediary implicit identifications TCE IDs of said TCEs. Furthermore, in these cases special values may be adopted for the TCE IDs indicating to map the actual TCE IP address from another entry in the mapping table. As a consequence, the operator does not have to perform unnecessary configurations. In addition, this feature provides a high degree of flexibility, in particular with respect to load balancing issues.

It is to be noted that the processing means that are configured to perform the partitioning and the encoding as described above may reside on different network nodes, among them but not limited to eNBs (evolved NodeB), RNCs (Radio. Network Controller) and MMEs (Mobility Management Entities).

BRIEF DESCRIPTION OF THE DRAWINGS

There are several ways how to design and further develop the teaching of the present invention in an advantageous way. To this end it is to be referred to the patent claims subordinate to patent claims 1 and 13 on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will we explained. In the drawing

DETAILED DESCRIPTION OF THE PREFERRED EMBODIMENTS

Figure 1:
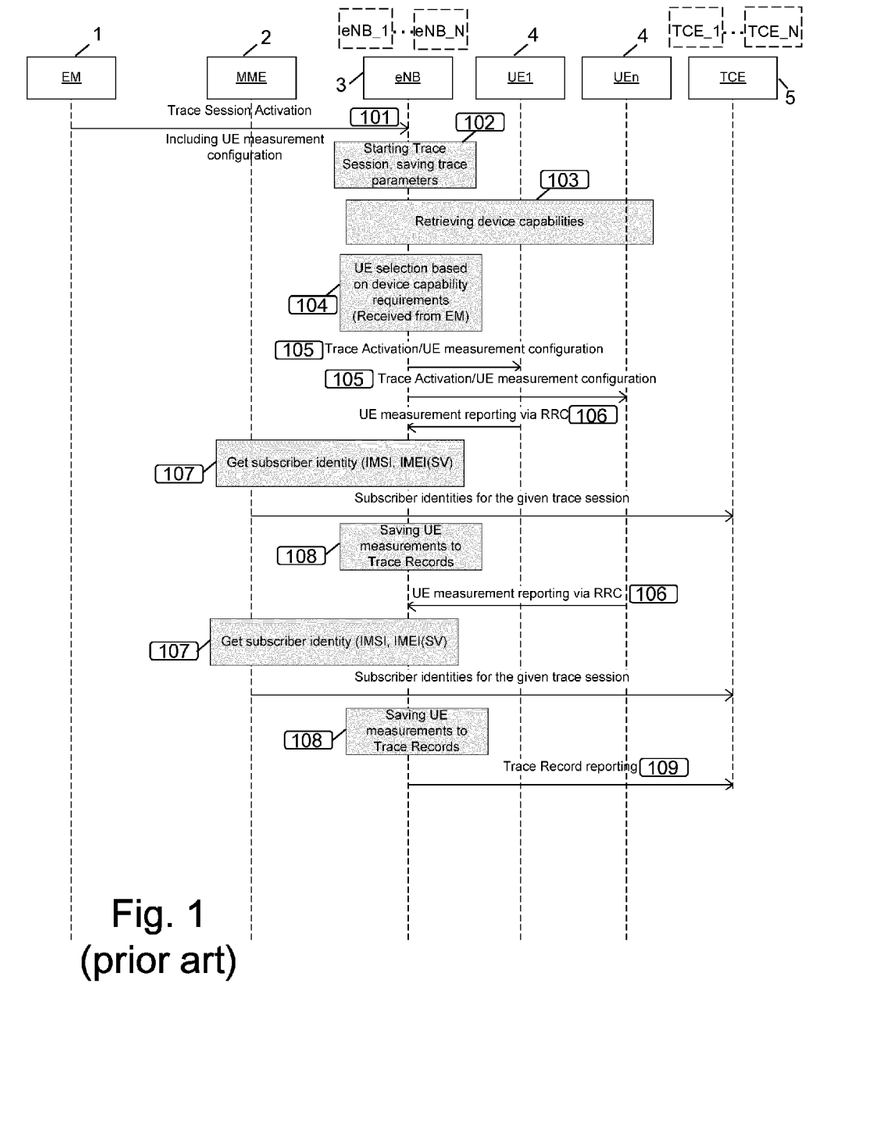
FIG. 1 is a flow diagram illustrating trace management in the context of a prior art scenario.

FIG. 1 is a flow diagram illustrating a standard procedure for activation and configuration of MDT and the report of logs from UEs, as described in document 3GPP TS 32.422 V10.2.0 (2010-12). Different network comments are involved in the tracing procedure, which in the specific scenario shown in FIG. 1 include EM (Element Manager) 1, MME (Mobility Management Entity) 2, eNB 3, a plurality of UEs (termed UE1 . . . UEn) 4, and TCE (Trace Collection Entity) 5.

In a first step 101 the EM 1 sends a Trace Session activation request to the eNB 3. Besides the parameters for configuring UE measurement (like job type, area selection conditions and device capability requirements), this request includes the IP address of the TCE 5 where the measurements of the trace session are to be stored. When the eNB 3 receives the Trace Session activation request from its EM 1, it starts at step 102 a Trace Session and saves the parameters associated to the Trace Session. At step 103 the eNB 3 retrieves the device capabilities from the available UEs 4, provided the device capability requirement is given for the Trace Session and eNB 3 did not retrieve the device capabilities before. At step 104 the eNB 3 selects the suitable UEs 4 for MDT data collection, wherein the selection may be based, e.g., on the device capability requirements received from EM 1 and the actual UE capabilities received from the UEs 4.

At steps 105, eNB 3 activates the MDT functionality to the selected UEs 4. In this connection the eNB 3 transmits configuration information to the UEs 4 which in case of UEs in idle mode include, possibly among other information, at least the Trace Reference information element and the IP address of TCE 5 where the measurements should be reported. When the UEs 4 receive the MDT activation they start the MDT functionality based on the received configuration parameters. The MDT related measurements are reported to the eNB 3 via RRC signaling (Radio Resource Signaling), as shown at steps 106. At steps 107, the eNB 3 contacts the MME 2, which in turn sends the subscriber identities (IMSI, IMEI(SV) to the TCE 5 for the given UEs 4, which reported the MDT reports to the eNB 3.

As shown at steps 108, when the eNB 3 receives the MDT reports from the UEs 4 in the RRC message the eNB 3 captures it and put it to the trace records. Finally, at step 109, the Trace Records are forwarded from the eNB 3 to the TCE 5 indicated in the MDT report received from the UEs 4.

The report of logs for UEs in idle mode as described above in connection with FIG. 1 comes along with some problems. In this regard it is important to note that (i) the eNB receiving the logged measurements can be different from the eNB having previously configured MDT on the UE and that (ii) several TCEs 5 can be present in the network (e.g. for load balancing purpose). In FIG. 1, this problem is indicated by the dashed boxes denoted eNB_1 . . . eNB_N and TCE_1 . . . TCE_N, respectively. As a simple solution currently envisioned in 3GPP, the UEs transmit the IP address of the TCE 5 back to the network in the report message (steps 106 of FIG. 1).

In view of this situation, the present invention addresses the problem of how a network entity receiving logged measurements, e.g. an eNB like in the scenario of FIG. 1, can retrieve—efficiently and in a way that satisfies security demands—the IP Address of the TCE where the measurements should be reported given that the TCE IP address is not available in the network entity (e.g. the eNB) when the UE moves from idle to connected mode.

Figure 2:
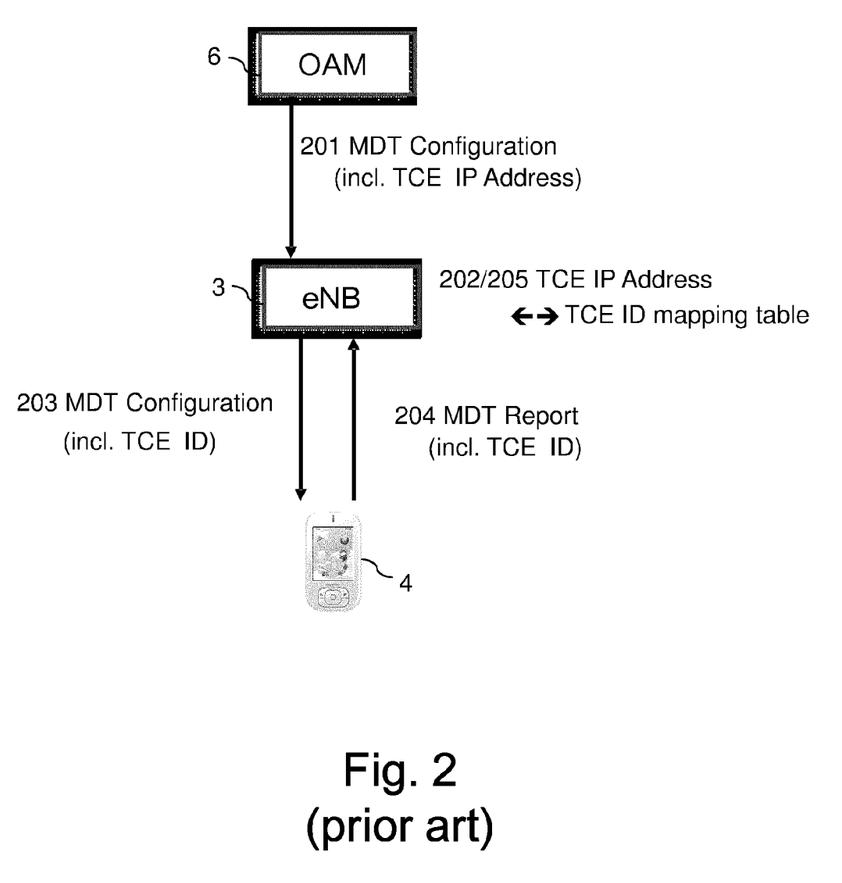
FIG. 2 is a flow diagram illustrating the usage of a TCE ID according to prior art.

FIG. 2 is a flow diagram illustrating a prior art solution to this problem that introduces an implicit identification of the TCE, termed TCE ID. In FIG. 2 the same reference numerals denote the same components as in FIG. 1. At step 201, the OAM (Operation, Administration and Maintenance) 6 transmits the MDT configuration including the corresponding TCE IP address to the eNB 3. By using the corresponding mapping table (step 202), the eNB 3 transforms the received TCE IP address into a TCE ID. At step 203, the eNB 3 sends the MDT configuration—including the TCE ID, and not the TCE IP address—to the UE 4. The MDT report sent from the UE 4 back to the eNB 3 (step 204) again only includes the TCE ID. Upon reception of the report at the eNB 3, at step 205 the TCE ID is mapped to the TCE IP address in the backend.

The above MDT procedure brings the requirement that the TCE ID has to be globally unique. Consequently, a general requirement for a "TCE ID" is basically that a TCE ID has to be unique within a network. To address this and considering also that each PLMN (Public Land Mobile Network) in shared NWs (networks) may configure its own TCE ID, the above solution adopts the following form of identification:

"TCE ID=PLMN ID(24 bits)+(within the NW) TCE ID (8 bits or less)".

Although this MDT procedure avoids revealing TCE IP addresses to mobile equipments and end users, it proves to be disadvantageous in that it introduces additional signaling over the rare radio interface. The requirement that the TCE ID has to be globally unique and has to be combined with a PLMN ID remains valid.

In contrast, according to an embodiment of the present invention efficient transmission of TCE IP address across different network elements in a 3GPP network (e.g. RNC or eNBs) in the context of MDT is achieved by using the concept of TCE ID as described above, thereby avoiding the transmission of an additional information element over the air. Instead, according to an embodiment of the present invention a partition ID is transmitted which can be encoded in signaling messages that already exist in the corresponding 3GPP standardization. Furthermore, an encoding mechanism is defined that guarantees backward compatibility with existing procedures of MDT. As will be explained in detail hereinafter, the encoding provides an efficient method to map the TCE IP address to the partition ID transmitted over the air.

In a specific embodiment of the invention, the existing information element to be used for encoding the new information element is the "Trace Reference", as specified in the above mentioned document 3GPP TS 32.422. This information is sent at configuration time from the network to the UE and at reporting time from the UE back to the network. The standard states that the Trace Reference information element shall be globally unique, therefore the Trace Reference shall compose as follows:

MCC+MNC+Trace ID, where the MCC (Mobile Country Code) and MNC (Mobile Network Code) are coming with the Trace activation request from the EM/NM (Element Manager/Network Manager) to identify one PLMN containing the EM/NM, and Trace ID is a 3 byte Octet String. It is noted that the Trace ID referred here is the same as Trace reference in previous releases of the standard and that the MCC+MNC being part of the Trace Reference from Rel-8 onwards (e.g. ignored by Rel-6/Rel-7 UTRAN Network Elements), the uniqueness of the Trace Reference may not be guaranteed with Rel-6/Rel-7 Network Element(s) involved in the Trace.

The general approach of the embodiment described here is to map the TCE ID to a Partition ID and to use the Partition ID as information carrying the TCE IP address across different network nodes. In other words, the TCE ID is encoded inside the Trace ID and the TCE-ID encoded inside the TraceID is transmitted to the UE. An important requirement of the TCE ID is that it has to be globally unique. This can be guaranteed with the help of the existing fields in the Trace Reference information element (MCC+MNC).

To achieve the above, the following steps are executed:
The space of the Trace ID is partitioned, so that each partition is associated to one or more TCEs.
A partition ID is encoded inside the Trace ID, so that syntax and semantic of the Trace ID are compatible with existing procedures in 3GPP.
At the reception of the logged measurements the Partition ID is extracted from the Trace ID.
The extracted partition ID is mapped to an IP address of the TCE and eventually to an intermediary TCE ID.

In the following the above steps are described in some more detail:

Partition of the Space of the Trace ID

The number of partitions of the space of the Trace ID depends on the number of TCEs in the network. The number of partitions is chosen to be at least equal as or larger than the number of TCEs in the network. As next step, the number of partitions is rounded to next power of 2 (i.e. 2^i for any i).

Figure 3:
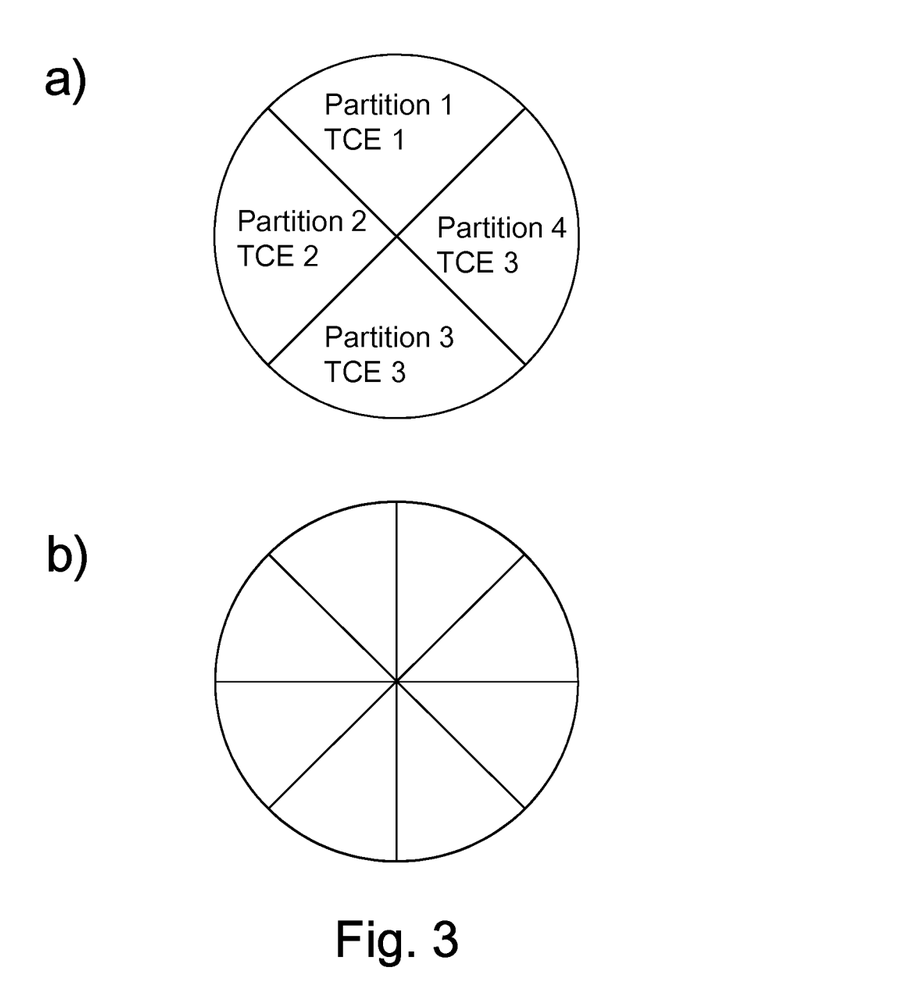
FIG. 3 is a schematic view illustrating partitioning of the space of the Trace ID according to an embodiment of the present invention.

FIG. 3 illustrates the process of Trace ID partitioning for two different exemplary situations. For instance, in the example of FIG. 3a is assumed that a number of 3 TCEs are provided inside the network (TCE1, TCE2, and TCE3). According to the above scheme this means that 4 (=2^2) partitions are needed. Each partition is associated with an ID, for instance, partition 1 is associated ID 00, partition 2 is associated ID 01, partition 3 is associated ID 10, and partition 4 is associated ID 11.

Since in the above case the number of TCEs is not a power of 2, particular TCEs can be associated to more than one partition. In FIG. 3a this is the case for TCE3, which is associated to partition 3 as well as to partition 4.

FIG. 3b illustrates the corresponding process of Trace ID partitioning for 2^3=8 partitions, which can be applied for a number of TCEs between 5 and 8.

Encoding of Partition ID Inside the Trace ID

The encoding method is about transmitting the Partition-ID inside the Trace ID. Since the space of Trace ID has been partitioned, part of the bits of the Trace ID can be used to transport the Partition-ID.

As example the first bits of the Trace ID can be used to carry the partition-ID:

Trace ID=[PartitionId;TraceSubId], wherein the remaining bits of the Trace ID are used to carry a TraceSubId for identifying the trace.

As alternative the last bits of the Trace ID can be used:

Trace ID=[TraceSubId;PartitionId]

As further alternative, a bitwise operation can be performed between TraceSubId and PartitionId:

Trace ID=(TraceSubId with padding zeros at end/begin) XOR (PartitionId with padding zeros at end/begin)

In such a case the respective bitmask would have to be sent from the network to the UEs.

Extraction of Partition ID from the Trace ID:

The UE sends the Trace reference together with its measurements back to the network, as specified already in 3GPP TS 32.422. At the reception of the logged measurements, the network node (e.g. eNB) extracts the partition ID, for example through a bitwise operation.

If the first bits of the Trace ID have been used to carry the partition ID, the bitwise operation performed by the eNB would be the following:

PartitionID=TraceID XOR [1.1;0.0]

If the last bits of the trace ID have been used for encoding the partition ID:

PartitionID=TraceID XOR [0.0;1.1]

In any case, the extraction of the partition ID has to be adapted to the applied encoding scheme by employing the respective the bitmask.

Mapping Partition ID to TCE ID and IP Address:

In the described embodiment of the present invention the partition does not identify immediately the TCE, but a mapping scheme should be provided. In the simplest case, the number of partitions is the same as the number of TCEs. In this case, the partition ID is equivalent to the TCE ID specified in document R2-110274, 3GPP contribution to RAN2#72bis, and the TCE IP address can be derived from a mapping table as follows:

| Partition ID = TCE ID (example for 4 partitions) | TCE IP Address (examples) |
|---|---|
| 0 (bits: 00) | 192.168.1.43 |
| 1 (bits: 01) | 192.168.1.53 |
| 2 (bits: 10) | 192.168.1.78 |
| 3 (bits: 11) | 192.168.1.96 |

In case the number of partitions is higher than the number of TCEs, it is beneficial that an operator does not need to configure more values than necessary. For example, in case of 5 TCEs, 8 partitions are used. In such case it would be preferable that operators configure only 5 values and not 8, in other words the actual number of partitions is hidden to the operator.

The requirement above can be achieved by splitting the partition ID and TCE ID in the mapping table and adopting a "special value" for TCE ID. This special value indicates that the actual IP address should be mapped from another entry in the table, e.g. from the next/subsequent entry. A specific example embodiment is illustrated in the following table:

| Partition ID (example for 8 partitions) | TCE ID (example for 5 TCE IDs) | IP Address (examples) |
|---|---|---|
| 0 (bits: 000) | Special value | <empty> |
| 1 (bits: 001) | 1 | 192.168.1.43 (used by partitions 0 and 1) |
| 2 (bits: 010) | 2 | 192.168.1.53 (used by partition 2) |
| 3 (bits: 011) | Special value | <empty> |
| 4 (bits: 011) | 3 | 192.168.1.78 (used by partitions 3 and 4) |
| 5 (bits: 011) | Special value | <empty> |
| 6 (bits: 011) | 4 | 192.168.1.96 (used by partitions 5 and 6) |
| 7 (bits: 011) | 5 | 192.168.1.100 (used by partition 6) |

Values to be configured by an operator:
1 −>192.168.1.43
2 −>192.168.1.53
4 −>192.168.1.78
6 −>192.168.1.96
7 −>192.168.1.100

Thus, only 5 values need to be configured, even if 8 partitions are used.

The special value depends on the particular implementation of the mapping table, and it can be for example a null value, a 0 value (assuming the value 0 is reserved for this purpose), a −1 value or the max value of the variable.

The mapping table can also be used with only the columns Partition ID and TCE IP address.

One requirement of the MDT procedure as described above is the uniqueness of the TCE ID in the 3GPP network. The uniqueness of the TCE can be derived by looking at the entire information in the trace reference. The knowledge of MCC, MNC gives in fact unique reference to the TCE after the mapping above explained; this is shown in the italic part of the Trace Reference information element here below:

Trace Reference = $MCC + MNC +$ Trace $ID$ $= MCC + MNC + PartitionId + TraceSubId$ The MDT procedure with the mechanisms described above is illustrated in FIG. 4. It can be noted that, compared with the standard tracing procedure described in connection with FIG.

1, all the steps remain basically the same. Therefore the mechanisms are compatible with the existing procedure. The additional steps of encoding, decoding, extracting and mapping are highlighted in FIG. 4. In step 401 the eNB 3 performs the mapping between TCE IP addresses and TCE IDs. For instance, this step can be carried out immediately after receiving a trace session activation message from EM 1. When eNB 3 configures tracing on the UEs 4 it transmits configuration information to the UEs 4 (corresponding to step 105 in FIG. 1). However, in contrast to the standard procedure, this time the configuration message does not contain the TCE IP address. Instead, in steps 402 eNB 3 encodes the respective TCE ID into the Trace Reference information element as described above. Finally, in steps 403, which are carried out by the eNB 3 after having received the UE measurement reports, the TCE ID contained in the Trace Reference information element is decoded and mapped into the respective TCE IP address.

Figure 4:
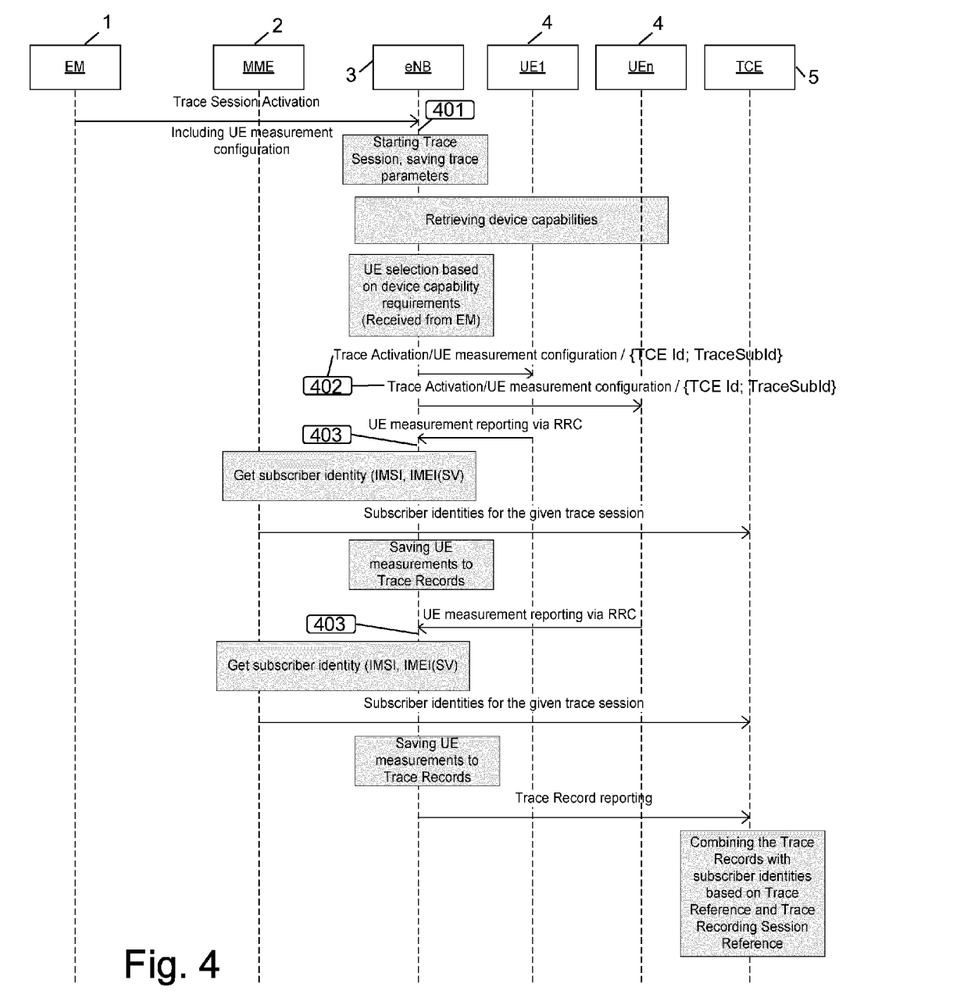
FIG. 4 is a flow diagram illustrating trace management according to an embodiment of the present invention.

The step of partitioning the Trace ID space is not explicitly shown in FIG. 4, since it may be performed a priori through OAM procedures.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of managing trace sessions in a network, wherein each trace session is assigned a Trace identification (ID) and a specific trace collection entity (TCE) from a plurality of trace collection entities (TCEs) disposed inside said network for storing related measurements of said trace session, the method comprising the steps of:
    partitioning the space of the Trace ID such that each partition is associated to one or more of said plurality of TCEs;
    encoding a partition identification (ID) inside said Trace ID; and
    mapping said partition ID to a specific TCE from said plurality of TCEs.

2. The method according to claim 1, wherein said Trace ID together with a network operator identity is contained in a Trace Reference information element, wherein said Trace ID uniquely identifies said trace session within said network operator.

3. The method according to claim 2, wherein said Trace Reference information element is transmitted from said network to User Equipment (UE) in a trace session configuration message.

4. The method according to claim 3, wherein the number of partitions of said Trace ID is a power of two, which is chosen to be greater or at least equal to the number of said plurality of TCEs disposed inside said network.

5. The method according to claim 2, wherein said Trace Reference information element is transmitted from User Equipment (UE) to said network together with User Equipment measurement reports.

6. The method according to claim 2, wherein the network node receiving said Trace Reference information element extracts said partition ID from said Trace Reference information element.

7. The method according to claim 6, wherein the network node receiving said Trace Reference information element extracts said partition ID from said Trace Reference information element by performing a bitwise XOR operation.

8. The method according to claim 2, wherein the number of partitions of said Trace ID is a power of two, which is chosen to be greater or at least equal to the number of said plurality of TCEs disposed inside said network.

9. The method according to claim 1, wherein the number of partitions of said Trace ID is a power of two, which is chosen to be greater or at least equal to the number of said plurality of TCEs disposed inside said network.

10. The method according to claim 1, wherein said encoding is performed by using a predetermined part of the bits of said Trace ID for transporting said partition ID.

11. The method according to claim 10, wherein the remaining part of the bits of said Trace ID is used for transporting a Trace sub-identification.

12. The method according to claim 10, wherein a bitmask employed for specifying the respective parts of the bits of said Trace ID is transmitted from said network to User Equipment (UE).

13. The method according to claim 11, wherein a bitmask employed for specifying the respective parts of the bits of said Trace ID is transmitted from said network to User Equipment (UE).

14. The method according to claim 1, wherein a mapping table is provided that maps said partition IDs to TCE internet protocol (IP) addresses.

15. The method according to claim 1, wherein a mapping table is provided that maps said partition IDs to intermediary implicit identifications (TCE IDs) of said TCEs.

16. The method according to claim 15, wherein, when a number of said partitions is higher than a number of TCEs disposed inside said network, special values are adopted for said TCE IDs indicating to map an actual TCE IP address from another entry in said mapping table.

17. A trace session management system, comprising:
    at least one network entity configured to activate trace sessions with an assigned Trace identification (ID);
    user equipment (UE) configured to perform tracing;
    a plurality of trace collection entities (TCEs) that store trace session measurements from said UE; and
    processing means configured i) to partition the space of the Trace ID such that each partition is associated to one or more of said plurality of TCEs, ii) to encode a partition ID identification (ID) inside said Trace ID, and iii) to map said partition ID to a specific trace collection entity (TCE) from said plurality of TCEs.

18. The system according to claim 17, wherein said processing means are associated with any of an evolved NodeB, a Radio Network Controller, and a Mobility Management Entity.

* * * * *